3,378,056
SPINNABLE RESINOUS COMPOSITION OF A
POLYESTER AND A POLYAMIDE
James J. Robertson, Akron, Ohio, assignor to The Firestone Tire & Rubber Company, Akron, Ohio, a corporation of Ohio
Filed Jan. 5, 1966, Ser. No. 518,808
7 Claims. (Cl. 152—359)

ABSTRACT OF THE DISCLOSURE

There is provided a spinnable resinous composition of a polyester, such as poly (alkylene aryl dicarboxylate) and a polyamide, which composition is characterized by the inclusion therein of a minor amount of the reaction product of isophthalic acid and hexamethylene diamine.

This invention relates to a novel composition of matter, and to its preparation, and more particularly to a composition of matter having improved spinning characteristics. Still more specifically, this invention relates to improvements in the melt spinning characteristics of a polyester polyamide blend, the improvements being obtained by incorporating into the blend polyhexamethylene isophthalamide additive (hereafter referred to as the additive).

The composition of this invention is characterized by valuable properties which render it especially useful as a material from which filaments or strands may be spun and drawn by conventional spinning apparatus, the filaments or strands may then be fashioned into cords which have particular utility in reinforcing rubber articles, especially ply stock for use in fabricating pneumatic tires.

The principal difficulty with nylon cord reinforced rubber articles has been in respect of the property of nylon to "cold flow" which, in the case of pneumatic tires results in a harmless but undesirable situation known as "flat spot." This occurs when nylon cord reinforced pneumatic rubber tires in position on an automobile are allowed to stand for a considerable period of time, wherein results a "flat spot" on the tire in the area which has been in contact with the ground. Until the tires have ben driven for a short period of time after standing, the driver detects an undesirable thumping.

This undesirable property of "cold flow" can be reduced by physically blending a polyester, particularly a poly(alkylene terephthalate) in which the alkylene group contains from 2 to 4 carbon atoms, e.g. poly(ethylene terephthalate) as one phase, and a polyamide, particularly poly(amino acids) or poly(lactams), e.g. nylon-6 [poly(epsilon-caprolactam)] nylon 66 (polyhexamethylene adipamide) and poly(enantholactam) as a separate phase. Accordingly, rubber articles reinforced with filaments or cords formed from the mentioned polyester polyamide blends exhibit greatly reduced "cold flow" properties.

However, one of the difficulties in producing the aforementioned filaments from physical blends of a polyester and polyamide is found in the characteristics of the blend with respect to spinning. These blends are spun through a conventional spinneret by extruding the blend under pressure at a temperature slightly above the melting point of the higher melting component thereof. When the blend is spun without inclusion of the additive in accordance with the principles of this invention, difficulty in spinning is encountered.

The difficulties encountered include non-uniformity in diameter of the filament emerging from the spinneret, the variation being sufficient at times to so reduce the diameter that breakage of the filament occurs. Another difficulty is that the temperature range of spinning is quite limited.

According to the present invention, it has been found that the spining characteristics of a physical blend of a polyester and a polyamide is improved by incorporating into the blend a minor amount of polyhexamethylene isophthalamide additive. In general, from .5 to 20 parts by weight of the additive per 100 parts by weight of the blend will suffice to improve the spinning characteristics of the entire composition. Not only does the inclusion of the additive improve spinnable blends in respect of its spinning characteristics, but such inclusion renders spinnable blends which in the absence of such addition agents were either unspinnable or gave poor spun products. The range of concentration of the polyester in relation to the polyamide is expanded as well as the number and kind of polyesters and polyamides which may be successfully blended together to yield spinnable compositions.

To the accomplishment of the foregoing and related ends, this invention, then consists of the means hereinafter fully described and particularly pointed out in the appended claims, the following description and annexed drawings setting forth in details certain illustrative embodiments of the invention, such disclosed means consitituting, however, but a few of the various forms in which the principle of this invention can be employed.

Figure 1:
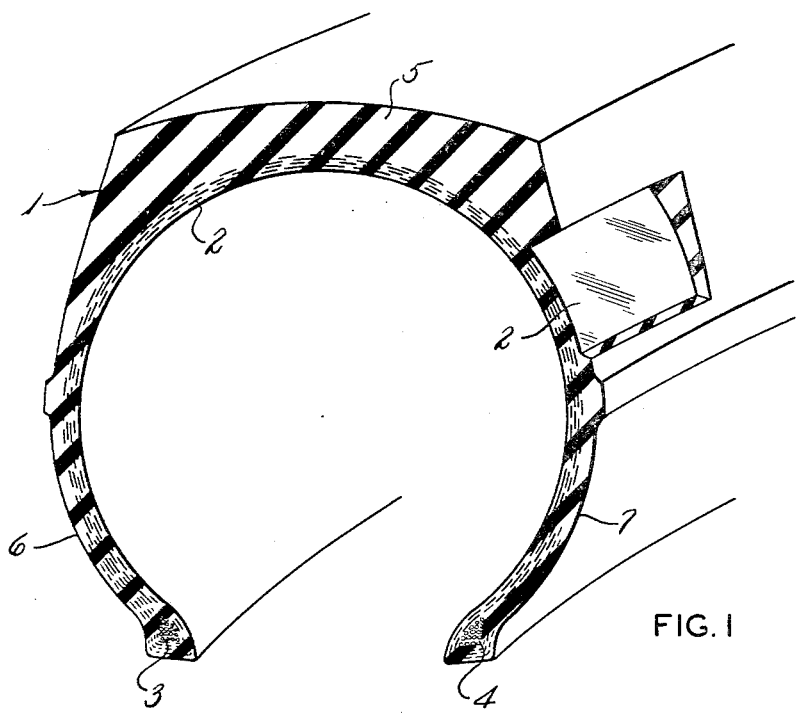
FIG. 1 is a cross-sectional view of a pneumatic rubber tire including plies having embedded therein reinforcing elements formed from the compositions of the present invention.

Referring now more particularly to FIG. 1 there is here shown in cross-section a pneumatic rubber tire generally indicated at 1, and composed of a rubberized fabric body portion 2 terminating at its edges in two inextensible bead portions 3 and 4. The rubbery tread 5 is superimposed and bonded, as by vulcanization, to cord reinforced portion 2. Rubbery side walls 6 and 7 extend from respective edges of the thread along the fabric body portion 2 to which they are bonded, respectively to the bead portions 3 and 4.

Figure 2:
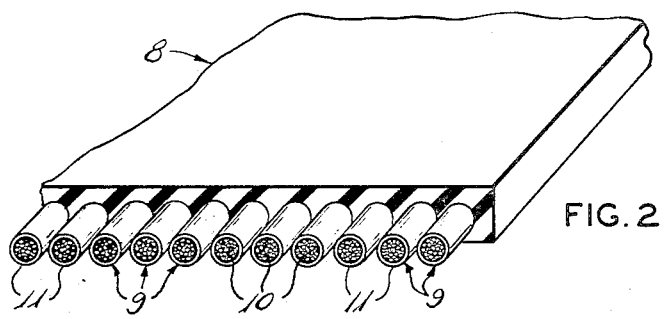
FIG. 2 is an enlarged, fragmentary perspective view in section, and somewhat diagrammatic, showing a portion of a ply including in oriented fashion, reinforcing elements formed from the composition of the present invention and having a coating of dip composition thereon.

FIG. 2 is a fragmentary, partially diagrammatic cross-sectional view in perspective showing a ply from which the body portion 2 of FIG. 1 may be formed and generally indicated at 8. Ply 8 is conveniently formed by calendering the desired rubber stock material onto and around the reinforcing elements 9. Reinforcing elements 9 as shown in FIG. 2 are composed of cords 10 of a formation, such as, those known as 840/3. This symbol indicates a cord formed from 3 strands of 840 denier yarn of the present invention twisted together. For use in reinforcing conventional 2-ply pneumatic passenger car tires, a cord having a denier of about 2520 is preferred. The cord denier may range from 1600 to 6000. Surrounding each of the cords 10 and diagrammatically illustrated, is a coating 11 which coating is formed on the cords 10 by dipping in a conventional nylon cord dipping composition followed by removal of excess dip composition and drying of the cord by conventional means. Such conditions of temperature as will promote the formation of an infusible, insoluble resin from the reactive resins constituents included in the dip composition may be used. It will be understood of course, that the cords 10 are well coated with the dip composition and that the resin-elastomer coating penetrates and becomes mechanically locked and adhered to the cord. In fabricating pneumatic rubber tires in accordance with this invention conventional procedures and apparatus are used.

The rubber stock reinforcing elements formed from the compositions of the present invention may be present in the form of single strands, a plurality of strands twisted together, or strands formed from a plurality of fibers in generally oriented condition and twisted with one or more other strands to form a cord. Also these reinforcing elements may be formed from a plurality of cords which in turn have been twisted together to form a composite cord material such as that which is shown in FIG. 3 of U.S. Patent No. 2,991,818. In certain instances, it may be desirable to include in the cords different fibrous materials, for example, different synthetic fibrous material and/or natural occurring fibrous materials. Among the natural occurring fibers which may be used in forming composite cords are cotton, hemp, wool, animal hair, silk, etc. Glass, asbestos, pure nylon, pure poly(ethylene terephthalate), steel wire, cellulose acetate, rayon, etc. are examples of additional synthetic fibers which may be used.

The resinous blends as aforementioned are an intimate mixture of a polyester and a polyamide. The amount of the polyester varies from 25% to 65% by weight of the entire blend. This concentration is critical. Below a concentration of 25% of the polyester resin, the problem of "flat spot" or the inhibition of "cold flow" in the nylon is not observed to a degree which is satisfactory. Above 65% concentration of the polyester, no difficulties in spinning are encountered. Thus, the composition of the present invention are rather precisely limited within the range of 25% to 65% by weight of the polyester dispersion in from 75% to 35% by weight of the polyamide.

To form spinnable resinous compositions in accordance with this invention, spinnable resinous components are employed. For the polyesters, particularly the poly(alkylene aryl dicarboxylates), those polymers which have average molecular weight of from 16,000 to 30,000 are spinnable. Stated in another way, these polyesters have an intrinsic viscosity in the range of 0.6 to 1.2. The preferred alkylene dicarboxylates contain from 2 to 12 carbons in the alkylene group and are alkylene aryl dicarboxylates. The alkylene groups may be branched chain or straight chain. These materials are commercially available, the most useful polyester being poly(ethylene terephthalate) having an intrinsic viscosity within the aforesaid range. Other useful poly(alkylene aryl dicarboxylates) having an average molecular weight in the above range and an intrinsic viscosity in the range of from 0.6 to 1.2 include poly(propylene terephthalate); poly(butylene terephthalate); poly(hexamethylene terephthalate); poly(octamethylene terephthalate); poly(decamethylene terephthalate); and poly(dodecamethylene terephthalate).

The polyester must have a melting point at least as high as 200° C. and more desirably higher than 200° C. e.g. up to 275° C. Melting points of at least 200° C. are required for use in tire cords, and for this use, the polyester is usually terephthalate. The aryl dicarboxylic acids are preferably symmetrical, particularly for use in tire fabrics, and they include for example, terephthalic acid, sym.-biphenyl dicarboxylic acid, diphenyl methane dicarboxylic acid (preferably the 4,4'-isomer); diphenyl-1, 2-ethane dicarboxylic acid, the naphthoic and anthracene dicarboxylic acid, etc. The acids contain from 8–16 carbon atoms, or more.

The linear polyamide must have a melting point at least as high as 175° C. or 200° C., and preferably higher, such as, for example, 225 or 240 or 250 or 275° C. Polyamides which may be used include those derived from dicarboxylic acids, such as, for example, succinic acid, glutaric acid, adipic acid, pimelic acid, suberic acid, azelaic acid, and sebacic acid; and from diamines containing, for example, 2 to 10 carbon atoms, such as ethylene diamine, tetramethylene diamine, hexamethylene diamine, octamethylene diamine, 1,4-di(methylamino) cyclohexane, as for example, nylon 66 or nylon 410, etc.; or the nylon may be derived from an omega-amino carboxylic acid such as omega-aminobutyric acid, omega-aminopimelic acid, omega-aminocaproic acid, etc., or the lactams thereof. Thus, the blend may be made utilizing nylons 4, 5, 6, 7, 8, and 11. The polyamide may be prepared from a lactam containing from 4 to 11 carbon atoms.

The polyamides desirably have molecular weights in the range of 16,000 to 30,000.

In a preferred embodiment the nylon component is a resinous polymer of epsilon-aminocaproic acid having an average molecular weight in the range of 18,000 to 27,000. This molecular weight range corresponds to a relative viscosity as determined in 98% sulphuric acid at 25° C., in the range of 2.5 to 3.2. This determination is made from a solution of 1 gram of the polymer in 100 ml. of the acid. Particularly suitable resinous compositions of this character are commercially available under the trade names nylon-6 and nylon-7[poly(amino-heptanoic acid)].

Although the viscosity characteristics of each of these resins could be expressed in like terms, current trade practice is to identify the polyester resins in terms of their intrinsic viscosity measured at 25° C. in a 50/50 solution of phenol/tetrachloroethane and the nylon resins in terms of their relative viscosity measured as a 1 percent by volume solution in sulfuric acid.

The production of a satisfactory blend of these resins involves a careful procedure. In the first place, it is desirable to prevent random interaction between the resin constituents of the blends of this invention. The compositions of the present invention are mixtures of resins formed under conditions to maintain two separate phases and to minimize insofar as is possible the interaction of one polymeric substance with the other. Although chemical interaction can be controlled by physical means, another means of minimizing such chemical interaction between the polymers is to utilize end-blocked polymers or partially end-blocked polymers. Both resins normally have terminal groups present in the reactants from which the resins are formed, e.g. —OH, —COOH, and NH₂. Blocking of the reactive ends by reactions with mono-functional alcohols, acids, amines, or the like will be helpful in minimizing undesired interaction.

In the case of the nylons, the commercial materials usually contain some end-blocking, the terminal groups being derived from butyl ammonium acetate, acetic acid, adipic acid, sebacic acid, or butyl amine.

To produce blends of the two resins, with the additive whose preparation is hereinafter described in detail, it has been found convenient to use a conventional screw type extruder. The materials are blended as rapidly as possible and at a temperature which is as low as possible but still above the melting point of the constituents. No added solvent is employed. The temperature of blending is difficult to pinpoint because with resins of different molecular weights the melt viscosity varies and is rather ill defined at best. However, the temperature of blending is that minimum temperature above the melting point of the higher melting resin where there is obtained the desired blending in as short a period of time as possible. The extruder yields a strand like product which is then chopped into pellets or chips, dried and then spun through a spinneret of the type conventionally used for spinning nylon or poly(ethylene terephthalate) resins. Any mixing apparatus that yields good mixing at minimum residence time and minimum temperature can be used.

To prepare a satisfactory blend with a given polyamide material and a given polyester, there are several important considerations.

First, the materials to be blended must be thoroughly dry having a moisture content below about .05% by weight. Moisture contents in excess of this amount tend to degrade the polymers. It is preferred for best results that the moisture contents be below about 0.02%.

It has also been found that for satisfactory spinning the moisture content of the blend at the time of spinning should be below about 0.01%.

The next important consideration in spinning these blends is the dwell time, or residue time, during which the blend is in the molten state. Because these resins are mutually reactive, conditions favoring interaction of the polymers should be maintained for the shortest possible period of time. The rate of interaction is a function of time and temperature. To the achievement of the end of minimizing interaction antioxidants, chain stoppers and copper stabilizers may be incorporated with the blend. A convenient temperature range in which to effect the blending is from 480° F. to 540° F. A commercially available nylon-6, poly(epsilon-caprolactam), has a melting point in the range of 419° F. to 428° F. and is normally spun at a temperature of 475° F.–540° F. A suitable commercially available poly(ethylene terephthalate) has a melting point in the range of 464° F. to 520° F. For purposes of spinning, the nature of the major component in the blend determines the spinning temperature, thus, in a 70/30 nylon 6 poly(ethylene terephthalate) blend of the resins above-mentioned, the spinning temperature would be that of the nylon-6, i.e. 475° F.–540° F.

Generally speaking in respect of spinning, conventional spinning techniques are applicable to the composition of the present invention and thus conditions which are based on spinning either of the components alone are the conditions which may be used for spinning the blend of the components.

For spinning purposes, the moisture content of the blend is desirably less than 0.02%, and preferably less than 0.01% by weight. After the product has been blended, and the resulting strand-like product chopped into pellets and the pellets are dried by any suitable means such as vacuum drying at 176° F. to 260° F., or dry hot nitrogen gas can be passed over the pelletized product. The product is capable of picking up moisture on exposure to the atmosphere and in two hours time at room temperature the moisture content may increase from a minimum of .01% to 0.1%.

It becomes convenient at this point to further illustrate the invention by giving specific examples of compositions and methods of forming such compositions, it being understood that these examples are for illustrative purposes only and pursuant to the teachings of which those skilled in the art will be able to devise and blend additional examples of the two resin components used in forming these blends. All parts are parts by weight.

Example I.—Preparation of a polyamide

Poly(epsilon-caprolactam) was prepared by reacting 100 parts by weight of caprolactam and 0.5 part by weight of butyl amine for 16 hours at 256° C. in a closed container. The resultant polymers were ground in a Wiley mill, washed with deionized water for 16 hours at 70° C. and dried for 16 hours at 80° C. in a vacuum dryer. The total polymer yield was 90 percent. The relative viscosity of the nylon as determined on a one percent solution by volume in concentrated sulphuric acid was 2.60, indicating a molecular weight of approximately 19,000.

Preparation of a polyester

A polyester was prepared by reacting 194 parts by weight dimethyl terephthalate, 124 parts by weight ethylene glycol, 0.06 part by weight antimony trioxide and 0.10 part by weight manganese acetate. The reaction was carried out in a three-neck flask fitted with a mechanical stirrer, a nitrogen inlet tube and a take-off condenser. The reaction was heated by means of a Glascol heating mantle to 156° C. at which time the methanol which was formed began to distill. The reaction temperature was raised to 249° C. over a period of three hours, all methanol having been removed at this time. A vacuum of 1–2 mm. was slowly applied with the temperature rising to a maximum of 280° C. The reaction was continued for 5 hours under a vacuum of 1–2 mm. to give a polyester with an intrinsic viscosity of 0.70 as measured at 25° C. in a 50/50 solution of phenol and tetrachloroethane.

Preparation of polyhexamethylene isophthalamide additive

Components: Parts by weight
- A. Isophthalic acid _____ 58.85
  - Deionized water _____ 71.0
- B. Hexamethylene diamine (90 percent) ____ 45.8
  - Deionized water _____ 24.0
- C. Glacial acetic acid _____ 0.15
  - n-Butyl amine _____ 0.122
  - Deionized water _____ 0.45

The water of A was added to a reactor, followed by the isophthalic acid of A with agitation to form a thin slurry. The reactor was flushed with nitrogen and the diamine solution of B was slowly added (over a period of 15–30 minutes) with agitation. After 95 percent of the diamine was added, a sample was drawn and pH determined. Addition of the diamine is continued until a pH of 7.8–8.2 is realized.

To the above, solution C was added and the reactor heated to obtain a pressure of 80–125 p.s.i. The pressure was reduced to atmospheric and the reactor slowly purged of water vapor.

By bleeding off the water vapor pressure slowly excessive foaming in the reactor was avoided and the polymer was kept molten at a temperature of 400–406° F. Heating was continued to a temperature of 480–490° F. with intermittent stirring, until a plasticity of 5,000–6,000 mm.$^2$ at 250° C. was obtained. The polymer was then pumped out of the kettle through a die and strands were cut. After drying, the polymer was dried in a vacuum drier 16–18 hours at 185° F. with a vacuum of less than 1 mm. Hg.

The dried resin was sampled for final plasticity measurement and relative viscosity. Polymers with melt plasticities at 250° C. of 5,000–6,000 mm.$^2$ with respective relative viscosities in the range of 1.7–2.2 are preferred.

Melt plasticity is determined by measuring the area in square millimeters of a plaque formed by subjecting a 0.50 g. sample of the resin to 2000 p.s.i. for 30 seconds at 250° C.

Example II

Poly(epsilon caprolactam), as prepared in Example I, 65 parts by weight relative viscosity of 2.75 and poly-(ethyleneterephthalate), as also prepared in Example I, 35 parts, intrinsic viscosity = 0.7, and polyhexamethylene isophthalamide, also as prepared in Example I, 10 parts by weight, plasticity at 250° C. of 6,000 mm.$^2$ were blended by passing through a one inch National Rubber Machinery (NRM) Company extruder. This blend was thoroughly dried and spun at a spinning temperature of 500° F.–550° F. by conventional techniques. The uniformity as determined by the ratio of the diameters of the 5 largest and 5 smallest filaments was below 2.0. A uniformity below 2.0 is desirable.

The yarn drawn by conventional techniques drew satisfactorily to give a tenacity between 6.0–7.0 g./d. and without undergoing a large number of filament breaks.

Example III

Poly(epsilon-caprolactam), relative viscosity to 2.75, poly(ethylene terephthalate), intrinsic viscosity of 0.70, and polyhexamethylene isophthalamide, all prepared as in Example I, were blended in a one inch NRM extruder in the following proportions:

| Component | Parts by Weight | | |
|---|---|---|---|
| Poly(epsilon-caprolactam) | 60 | 50 | 40 |
| Poly(ethylene terephthalate) | 40 | 50 | 60 |
| Polyhexamethylene isophthalamide | 5 | 10 | 15 |

The blends were thoroughly dried and spun at stock temperatures of 500° F.–550° F. by conventional techniques into yarn.

The yarn was drawn by conventional techniques. Broken filaments were not a problem.

Example IV

Poly(epsilon-caprolactam), 70 parts by weight, relative viscosity of 2.75, and poly(ethylene terephthalate), 30 parts, intrinsic viscosity of 0.7 were blended with 10 parts by weight polyhexamethylene isophthalamide and fed into a one inch NRM extruder, preconditioned by first passing a 70/30 blend of the above poly(epsilon-caprolactam) and poly(ethylene terephthalate) through the extruder at 535° F.

The poly(epsilon-caprolactam)-poly(ethylene terephthalate)-polyhexamethylene isophthalamide blend was chipped, oven dried overnight and further dried in a vacuum 24 hours at 210° F.

The resultant blend was spun to a uniformity of less than 2.0 as determined from the 5 largest and 5 smallest filaments.

Example V

Poly(epsilon-caprolactam), 65 parts by weight, relative viscosity 2.75, and poly(ethylene terephthalate), 35 parts by weight, intrinsic viscosity 0.78 were blended by passing through a one inch NRM extruder. No additive was used. This blend was thoroughly dried and spun at a temperature of 520° F. to obtain 4360/90 yarn. This yarn had a uniformity of 7.18 and greater than 10 at higher spin temperatures. The yarn drew poorly and had a tenacity of less than 4.0 g./d.

Many devices for expanding residence life of the resins at temperatures above their respective melting points may be employed, such as, the use of reaction inhibitors, e.g. antioxidants, and certain copper compounds, which tend to prevent or inhibit interaction of the resins. Work must be done upon the blend in order to achieve a satisfactory degree of intimate admixture of the components and the time of exposure to the blending operation is determined by the efficiency of the machine in achieving a blend.

If a pre-blending operation is used, the resin blend is normally cooled to normal temperatures, e.g. room temperature (25° C.), where it appears to be stable indefinitely. Even at the temperatures at which tires are normally operated there is no apparent deterioration of the resin blend. Likewise, after spinning, the resulting filaments exiting from the spinneret are quenched and then drawn in order to orient and develop maximum properties.

The following is a list of possible resinous blend components.

TABLE I

Polyesters:
(1) Poly(propylene terephthalate)
(2) Poly(tetramethylene teraphthalate)
(3) Poly(hexamethylene terephthalate)
(4) Poly(octamethylene terephthalate)
(5) Poly(decamethylene terephthalate)
(6) Poly(dodemethylene terephthalate)
(7) Poly(ethylene biphenyl dicarboxylate)
(8) Poly(trimethylene biphenyl-4,4'-dicarboxylate)
(9) Poly(ethylene diphenyl-1,2-ethane dicarboxylate)
(10) Poly(ethylene terephthalate)
(11) A polyester from dimethylol cyclohexane and terephthalic acid Polyamides:
(12) Poly(hexamethylene adipamide)
(13) Poly(enantholactam)
(14) Poly(omega-aminobutyric acid)
(15) Poly(omega-aminopimelic acid)
(16) Poly(omega-aminocaprylic acid)
(17) Poly(omega-aminoundecylenic acid)

Generally speaking, the incorporating of the polyhexamethylene isophthalamide additive has enabled the spinning of blends of polyesters and polyamides wherein the concentration of the polyester is substantially higher than heretofore permissible in a spinnable blend. For example, concentrations of the polyester above 25 parts per 100 parts of blend, e.g. 35, 40, and as high as 65 parts of polyester per 100 parts of blend have been rendered spinnable by the inclusion of the additive. The spins have had good uniformity over a broad temperature range of spinning, yielding yarns having optimum tenacities above 8.0 grams per denier.

Usually the polyester and the polyamide resins are blended in the presence of the additive. The blending and additive inclusion may be done in the spinning apparatus or in a separate piece of equipment, e.g. an extruder, prior to introduction into the spinning apparatus. Sufficient blending is achieved in a single or dual screw extruder to give particle sizes of the disperse polyester phase less than 5 microns and preferably in the range 2 to 3 microns.

An advantage of the inclusion of the additive of this invention in the resinous blends is that the spinning temperature range is broadened while maintaining good filament uniformity. High draw ratios with tenacities of between about 4 and about 9 grams per denier have been obtained.

It has also been found that with blends containing 40 parts of the polyester per 100 parts of resinous blend, about 10 parts of the additive about .5 part per 100 parts of resinous blend of a suitable lubricant wax either natural or synthetic, e.g. Acrawax C, a synthetic was, M.P. 137° C.–139° C., Sp.Gr. 0.975 spun well over a good temperature range, drew well and gave high tenacity.

What is claimed is:

1. A spinnable resinous mixture including as one phase from 25 to 65 parts by weight of a poly (alkylene aryl dicarboxylate) having an intrinsic viscosity in the range of from 0.6 to 1.2 as determined in a 50/50 solution of phenol/tetrachloroethane, and, as a separate phase, from 75 to 35 parts by weight of a polyamide in which the polymer unit contains from 4 to 20 carbon atoms, and having a relative viscosity as determined at 25° C. in a 1% by volume solution of sulphuric acid (98%) of from 2.5 to 3.2, the summation of the weights of the two phases totaling 100 parts and from 0.5 to 20 parts by weight per 100 parts by weight of said mixture of a reaction product of isophthalic acid and hexamethylene diamine, said reaction product having a relative viscosity in the range of 1.7 to 2.2, as determined at 25° C. in a 1% by volume solution of sulphuric acid (98%).

2. The resinous mixture of claim 1 wherein the reaction product of isophthalic acid and hexamethylene diamine is polyhexamethylene isophthalamide.

3. The resinous mixture of claim 2 wherein the polyhexamethylene isophthalamide has a melt plasticity at 250° C. of 5,000–6,000 mm.$^2$.

4. A textile filament consisting essentially of an intimate mixture of from 25 parts to 65 parts by weight of a poly(alkylene aryl dicarboxylate) having an intrinsic viscosity in the range from 0.6 to 1.2 as measured at 25° C. in a 50/50 solution of phenol/tetrachloroethane, as one phase, in from 75 parts to 35 parts by weight of a polyamide in which the polymer unit contains from 4 to 20 carbon atoms, and having a relative viscosity as determined at 25° C. in a 1% by volume solution of concentrated sulphuric acid (98%) of 2.5 to 3.2 as a separate phase, and containing intimately mixed therein from 0.5 to 20 parts by weight per 100 parts by weight of mixture of polyhexamethylene isophthalamide, said polyhexamethylene isophthalamide having a relative viscosity in the range of 1.7 to 2.2, as determined at 25° C. in a 1% by volume solution of sulphuric acid (98%).

5. The textile filament of claim 5 wherein the poly (alkylene aryl dicarboxylate) is a poly (ethylene terephthalate), and the polyamide is a poly (epsilon-caprolactam).

6. The textile filament of claim 5 wherein the poly (alkylene aryl dicarboxylate) is a poly (ethylene terephthalate and the polyamide is a poly (hexamethylene adipamide).

7. A pneumatic tire comprising a rubber tread portion overlying and bonded to a rubber body portion including reinforcing elements embedded therein and a pair of integral rubber side wall portions extending from said body portion and each terminating in an inextensible bead portion, said reinforcing elements including spun strands consisting essentially of an intimate blend of from 25 to 65 parts by weight of a poly (alkylene aryl dicarboxylate) having an intrinsic viscosity of from 0.6 to 1.2 as one phase, and from 75 parts to 35 parts by weight of a polyamide in which the polymer unit contains from 4 to 20 carbon atoms, and having a relative viscosity as determined at 25° C. in concentrated sulphuric acid (98%) of from 2.5 to 3.2 as a separate phase, and having intimately admixed therewith from 0.5 to 20 parts by weight per 100 parts by weight of blend of polyhexamethylene isophthalamide, having a relative viscosity from 1.7 to 2.2, as determined at 25° C. in a 1% by volume solution of sulphuric acid (98%).

References Cited

FOREIGN PATENTS 132,546   5/1949   Australia.

MURRAY TILLMAN, Primary Examiner

P. LIEBERMAN, Assistant Examiner.

UNITED STATES PATENT OFFICE
CERTIFICATE OF CORRECTION

Patent No. 3,378,056                                                      April 16, 1968

James J. Robertson

It is certified that error appears in the above identified patent and that said Letters Patent are hereby corrected as shown below:

Column 1, line 44, "been" should read -- ben --; line 53, after the bracket, insert a comma. Column 2, line 43, "thread" should read -- tread --. Column 5, line 4, "residue" should read -- residence --. Column 6, line 47, "(ethyleneterephthalate)" should read -- (ethylene terephthalate) --. Column 7, line 57, "dodemethylene" should read -- dodecamethylene --. Column 10, after line 6, insert 8. A method of improving the spinning characteristics of a resinous mixture of a polyester and a polyamide which comprises:
    (a) blending from about 25 to 65 parts by weight of a polyester having a melting point of at least 200° C. and an intrinsic viscosity in a range of from about 0.6 to 1.2 as one phase and from about 75 to 35 parts by weight of a polyamide in which the polymer unit contains from 4 to 20 carbon atoms and having a relative viscosity as determined in 98% suphuric acid of 2.5 to 3.2 as a separate phase, and
    (b) including from 0.5 to 20 parts by weight per 100 parts by weight of (a) of polyhexamethylene isophthalamide.

In the heading to the printed specification, line 8, "7 Claims" should read -- 8 Claims --.

Signed and sealed this 17th day of March 1970.

(SEAL)
Attest:

EDWARD M. FLETCHER, JR.                                    WILLIAM E. SCHUYLER, JR
Attesting Officer                                                    Commissioner of Patents